Aug. 13, 1935.  A. BARÉNYI  2,011,432
PHOTOGRAPHIC FILM CAMERA
Filed Oct. 21, 1933  2 Sheets-Sheet 1

Inventor:
Arpád Barényi
by
Frank Reinhold.
Attorney.

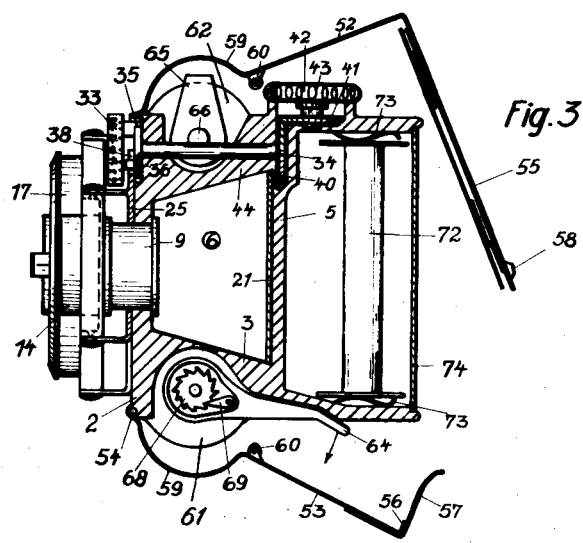
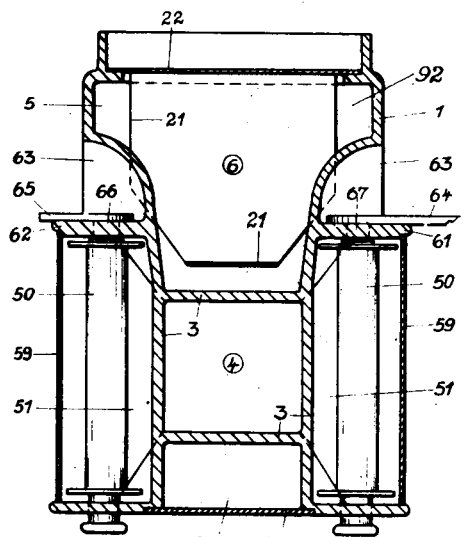
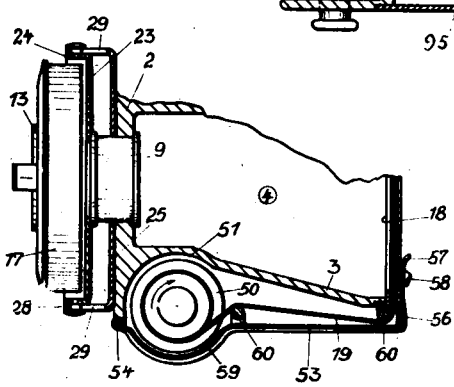

Patented Aug. 13, 1935

2,011,432

UNITED STATES PATENT OFFICE 2,011,432

PHOTOGRAPHIC FILM CAMERA

Árpád Barényi, Berlin-Lichterfelde, Germany, assignor to Voigtlander & Sohn Aktiengesellschaft, Brunswick, Germany, a joint-stock company of Germany Application October 21, 1933, Serial No. 694,624
In Germany October 27, 1932

15 Claims. (Cl. 95—31)

My invention relates to improvements in photographic film cameras, and more particularly in cameras of the box type, in which the film spools are mounted in chambers provided at either side of the light passage and at the rear of the front wall of the casing, and in which further a finder is provided above the said light passage, which finder comprises a finder lens located above the camera lens in the front wall of the casing, a reflector disposed at an angle of substantially 45° at the rear of the said finder lens, and a focussing screen disposed horizontally above the said reflector.

One of the objects of the improvements is to provide a camera of this type which is compact in form, and with this object in view my invention consists in providing a finder reflector and its mounting which are reduced in breadth at their front and bottom ends, so that room is spared at either side of the bottom part of the reflector and the film spools may be mounted close to the front part of the light passage and with their top ends laterally of the finder chamber. Further, room is spared at the reduced front part of the reflector for providing chambers above the spools and laterally of the finder chamber in which spool operating members such for example as the film winding key may be located.

As the film spools are thus disposed close to the light passage they project with their outer portions but slightly beyond the outlines of the casing, and the chambers receiving the same are closed at their outer sides by hinged lids which are slightly bulged outwardly to accommodate the spools.

Another object of the improvements is to provide a box camera comprising a finder in which the camera lens and the finder lens are secured to a common plate or frame located in front of the camera casing and connected with hand operated means for shifting the same and the lenses carried thereby in the direction of the optical axis.

Another object of the improvements is to provide mirrors by means of which certain readings such as the position of the iris-diaphragm and the shutter operating mechanism may be made from above and by the operator looking downwardly and on the focussing screen.

Other objects of the improvements will appear from the following description.

Figure 1:
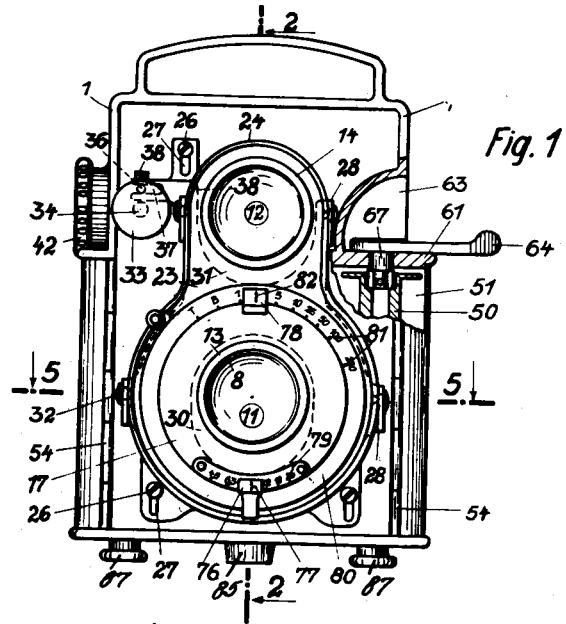
Figure 2:
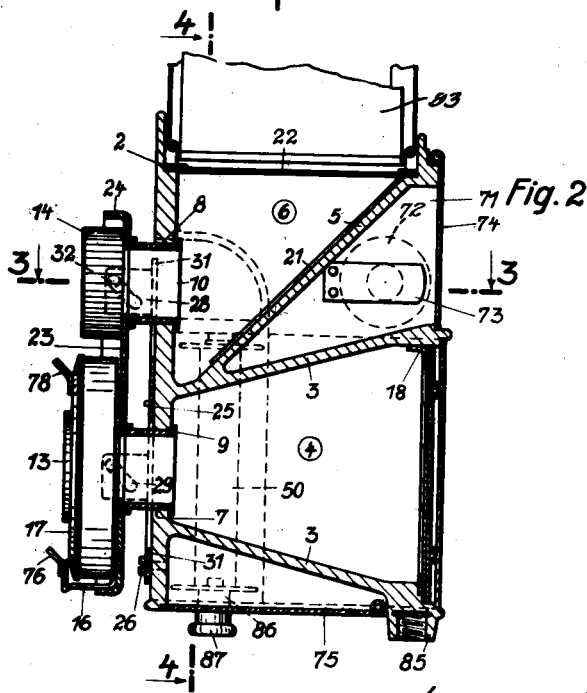

For the purpose of explaining the invention an example embodying the same has been shown in the accompanying drawings, in which the same letters of reference have been used in all the views to indicate corresponding parts. In said drawings, Fig. 1 is a front elevation showing the camera, some parts being broken away to show the manner of mounting one of the film spools and the film winding key, Fig. 2 is a sectional elevation taken on the line 2—2 of Fig. 1, Fig. 3 is a sectional plan view taken on the line 3—3 of Fig. 2, Fig. 4 is a sectional elevation taken on the line 4—4 of Fig. 2, and Fig. 5 is a partial sectional plan view taken on the line 5—5 of Fig. 1.

The outer case or body 1 of the camera comprises a front wall 2, four walls 3 connected with the front wall and flaring outwardly and rearwardly therefrom to provide the light passage 4, and a partition 5 extending at an angle of 45° from the top part of the light passage 4 rearwardly and upwardly to the top of the case, said partition providing a finder chamber 6. In circular holes 7 and 8 made in the front wall 2 of the case tubes 9 and 10 are shiftable in axial direction on which lenses 11 and 12 and their tubes 13 and 14 are supported. The lower lens 11 is the exposure lens, and it cooperates with an iris-diaphragm the setting member 16 of which projects forwardly in front of the shutter housing 17 of the objective. At the rear end of the light passage 4 a frame 18 for guiding the film 19 is provided, the said film being in position for being acted upon by the light-cone emanating from the lens 11.

To the partition 5 a reflector 21 is secured by means of which the rays emanating from the finder lens 12 are reflected upwardly and on a focussing screen 22 secured to and closing the open top part of the camera case. The said screen may be inspected through a collapsible shaft 23 of known construction. The lens 12, the reflector 21 and the screen 22 provide the finder.

The tubes 9 and 10 of the camera and finder lenses 11 and 12 are rigidly connected with each other by a plate or frame 23 by means of which simultaneous axial displacement of both lenses is insured. The said frame or plate is formed with a forwardly directed flange 24 embracing the lenses 11 and 12 and their mountings. At the rear of the frame or plate 23 a slide 25 is mounted on the front wall 2 of the case in suitable guide ways, such as pins 26 fixed to the front wall 2 of the case and engaging in vertical slots 27 of the slide. The said slide is formed with oblong cutout portions 30 and 31 permitting the passage of the tubes 9 and 10 therethrough. At either side of the mounting 14 of the lens 12 and the shutter housing 17 of the lens 11 the slide 25 is made integral with ears 28 formed with inclined cam slots 29 engaging pins 32 secured to and projecting from both sides of the mounting of the lens 12 and the shutter casing 17 of the lens 11. Therefore, when the slide 25 is shifted upwardly or downwardly, the lenses 11 and 12 and the parts associated therewith are simultaneously shifted in axial direction inwardly and outwardly.

For thus shifting the slide 25 a disk 33 is provided which is located at the front side of the wall 2 of the case, and which is mounted on an arbor 34. At the rear of the disk 33 a disk 35 is secured which is provided with an eccentric pin 36 engaging in a slot 37 of an ear 38 projecting laterally from the slide 25. Therefore, when the disk 33 is rotated such rotary movement is transmitted to the disk 35 and the pin 36 carried thereby, so that the slide 25 is shifted upwardly or downwardly. The said disk 33 is provided on its cylindrical face with graduation marks cooperating with a mark or pointer 39 carried by the front wall 2 of the case, the said graduation marks being provided with figures indicating the distance to which the lenses have been set by shifting the same inwardly or outwardly.

In the preferred construction shown in the figures the disks 33 and 35 and the shaft 34 are rotated through the intermediary of bevel gear wheels 40, 41 from a milled disk 42 secured to an arbor 43 mounted in the side wall 44 of the case and projecting laterally therefrom. Thus the lenses 11 and 12 may be set from the side of the case in the proper positions corresponding to the distance of the object and while the operator inspects the image of the object produced on the focussing screen 22. The adjustment of the lenses 11 and 12 may be read from the graduation marks made on the disk 33 and the pointer 39, and it is not necessary for the operator to inspect the disk 33 from the front side of the camera.

The film spools 50 are disposed close to and at the rear of the front wall 2 of the case and laterally of the front part of the light passage 4, and they are mounted in spool chambers 51 bounded by the vertical side walls 3 of the light passage 4 and by lids 52 and 53 hinged to the front wall 2 at 54. The lid 52 is made integral with a portion 55 adapted to cover the rear side of the bottom part of the case and the film 19, as is shown in Figs. 3 and 5, and the lid 53 is formed with a flange 56 adapted to overlap the margin of the portion 55 when the lids are closed. Thus, the spool chambers 51 and the light passage 4 are closed in a light-tight way. The lids 52 and 53 are bulged outwardly at 59 to accommodate the outer portions of the spools 50. To the lid 53 a spring catch 57 is secured which is adapted to engage a pin 58 secured to the portion 55 for holding the lids in closing positions. In each of the spool chambers 51 there are two rollers 60 on which the film 19 is guided.

The spool chambers 51 are closed at their top ends by horizontal partition walls 61 and 62, and above the said partitions chambers 63 are provided which are open at the sides of the camera. In one of the said chambers the film winding key 64, and in the other chamber a lever 65 are mounted. The lever 65 is fixed to the spool centre 66 of the feed spool, which centre is passed through a bore made in the partition wall 62 and is adapted to be retracted by means of the lever 65. The winding centre 67 is passed through a bore made in the wall 61 and it has a ratchet disk 68 secured to its top end, which is engaged by a spring-pressed pawl 69 carried by the film winding key 64. In the normal position the said key is located within the chamber 63, as is shown in Fig. 3, and when it is turned in the direction of the arrow a, the pawl 69 imparts rotary movement to the ratchet wheel 68 and the winding centre 67, whereby the film is wound on the spool. When the key 64 is turned in the opposite direction the pawl 69 slides on the ratchet disk 68 without acting on the spool.

By mounting the film spools in the manner described the dead spaces included between the lateral parts of the front wall 2 and the adjacent parts of the vertical walls 3 of the light passage are used for disposing the spools therein. In a similar way the space 71 included between the partition 5 and the top wall 3 of the light passage 4 is used for mounting certain parts therein. For example, an additional photographic film spool 72 may be stored within the said chamber, which film spool is held in position between a pair of leaf springs 73. Laterally of the reflector 6 chambers 92 are provided which may be used for keeping a yellow screen or a subsidiary lens therein. The chamber 71 is closed at its rear by a lid 74 hinged to the rear part of the case. After the lid 74 has been opened the spool 72 and thereafter the yellow screen and the subsidiary lens may be removed. However, separate lids may be provided for closing the chambers 92 located laterally of the reflector 21.

Finally, also the chamber located below the lower partition wall 3 may be used for storing certain parts therein, in which case the said space is closed by hinged lid 75.

As has been stated above, the graduation marks provided on the disk 33 may be inspected from above. In order to enable the operator to inspect also the adjustment of the iris-diaphragm and the shutter from above, the setting member 16 which embraces the shutter casing 17 carries an inclined mirror 76 which is formed at its middle with a mark 77 located in front of graduation marks 79, and a similar mirror 78 is provided for permitting inspection of the adjustment of the shutter from above. The shutter is set according to the desired time of exposure by means of a rotary ring 80. Graduation marks 81 provided on the said ring cooperate with the mirror 78 which is fixed to the shutter casing, and which is likewise provided with a mark 82. When the operator looks from above on the mirrors 76 and 78 he can read the graduation marks 79 and 81 by means of the mirrors 76 and 78 respectively.

At the bottom of the case an internally screw-threaded nipple 85 is provided by means of which the camera may be mounted on a stand. The lower spool centres 86 are extended outwardly to provide feet 87, and the length of the said feet is equal to that of the nipple 85, so that the camera may be placed with the said parts on a table or other support.

I claim:

1. A photographic-film camera, comprising a case formed with an outwardly and rearwardly flaring light passage, a camera lens and a finder lens mounted at the front side of the case, an inclined reflector in position for reflecting the rays emanating from said finder lens upwardly, said reflector being reduced in breadth at its front end as compared to the rear end, and film spools mounted in said case near the front wall thereof and laterally of said light passage and front part of said mirror.

2. A photographic-film camera, comprising a case formed with an outwardly and rearwardly flaring light passage, a camera lens and a finder lens mounted at the front side of the case, an inclined reflector in position for reflecting the rays emanating from said finder lens upwardly, said reflector being reduced in breadth at its front end as compared to the rear end, film spools mounted in said case near the front wall thereof and laterally of said light passage and front part of said mirror, and lids covering the sides of said camera and the film spools and formed with outwardly bulged portions to accommodate the outer parts of said film spools.

3. A photographic-film camera, comprising a case formed with an outwardly and rearwardly flaring light passage and with cavities disposed laterally of and above the front part of said light passage, a camera lens and a finder lens mounted at the front side of the case, an inclined reflector in position for reflecting the rays emanating from said finder lens upwardly, said reflector being reduced in breadth at its front end as compared to the rear end, film spools mounted in said case near the front wall thereof and laterally of said light passage and front part of said mirror, and spool operating members in said cavities.

4. A photographic-film camera, comprising a rigid case of fixed dimensions formed with a rearwardly and outwardly flaring light passage and having its front wall extended laterally beyond the front part of said light passage, film spools hinged to said front wall laterally of the front part of said light passage, and a lid comprising two portions and together covering the spool containing parts of said case and the rear part of said light passage.

5. A photographic-film camera, comprising a rigid case of fixed dimensions formed with a rearwardly and outwardly flaring light passage and having its front wall extended beyond the front part of said light passage, film spools mounted laterally of the front part of said light passage and at the rear of extended parts of the front wall, and lids hinged to the front wall of said case and covering the spool containing side parts thereof and one formed with a portion covering the whole of said light passage at its rear and the other being formed with a rim overlapping said portion covering the light passage.

6. A camera, comprising a case formed with a finder chamber, a camera lens and a finder lens and their mountings, said mountings being shiftable in the direction of the optical axes of said lenses, a frame rigidly connecting said lenses, a slide shiftable on said case, and a cam connection between said slide and frame constructed for shifting the frame in the direction of the optical axis when the slide is shifted.

7. A camera, comprising a case formed with a finder chamber, a camera lens and a finder lens and their mountings, said mountings being shiftable in the direction of the optical axes of said lenses, a frame rigidly connecting said lenses, a slide shiftable on the front wall of said case and formed with ears projecting forwardly therefrom into positions for embracing the mountings of said lenses and formed with inclined cam slots, and pins secured to said mountings and engaging in said cam slots.

8. A camera, comprising a case formed with a finder chamber, a camera lens and a finder lens and their mountings, said mountings being shiftable in the direction of the optical axes of said lenses, a frame rigidly connecting said lenses, a slide shiftable on the front wall of said case and formed with cut-out portions embracing said mountings and with ears projecting forwardly therefrom into positions for embracing the mountings of said lenses and formed with inclined cam slots, and pins secured to said mountings and engaging in said cam slots.

9. A camera, comprising a case formed with a finder chamber, a camera lens and a finder lens and their mountings, said mountings being shiftable in the direction of the optical axes of said lenses, a frame rigidly connecting said lenses, a slide shiftable on said case, a cam connection between said slide and frame constructed for shifting the frame in the direction of the optical axes when the slide is shifted, said slide being formed with a slot disposed transversely of the direction of movement of the slide, and a rotary member carrying an eccentric pin engaging in the slot of said slide.

10. A camera, comprising a case formed with a finder chamber, a camera lens and a finder lens and their mountings, said mountings being shiftable in the direction of the optical axes of said lenses, a frame rigidly connecting said lenses, a slide shiftable on said case, a cam connection between said slide and frame constructed for shifting the frame in the direction of the optical axes when the slide is shifted, and operating mechanism for said slide comprising a rotary operating member projecting laterally from said case.

11. A camera, comprising a case formed with a finder chamber, a camera lens and a finder lens and their mountings, said mountings being shiftable in the direction of the optical axes of said lenses, a frame rigidly connecting said lenses, a slide shiftable on said case, a cam connection between said slide and frame constructed for shifting the frame in the direction of the optical axes when the slide is shifted, said slide being formed with a forwardly directed ear having a slot disposed transversely of the direction of movement of the slide, a rotary member carrying a pin engaging in said slot and having its axis parallel to the optical axis, a rotary slide operating device projecting laterally from said case, and a bevel gearing connecting said member and operating device.

12. A camera, comprising a case formed with a finder chamber, a camera lens and a finder lens and their mountings, said mountings being shiftable in the direction of the optical axes of said lenses, a frame connecting said lenses, a slide shiftable on said case, a cam connection between said slide and frame constructed for shifting the frame in the direction of the optical axes when the slide is shifted, rotary means for shifting said slide, and a disk connected with said rotary means and carrying graduation marks on its cylindrical face.

13. A photographic-film camera, comprising a case formed with an exposure chamber having a rearwardly and upwardly inclined upper wall and a finder chamber having a rearwardly and upwardly inclined lower wall extending from the front part of said exposure chamber rearwardly and upwardly, the said upper wall of the exposure chamber and lower wall of the finder chamber defining a rearwardly widening space, and a lid for closing the said space at the rear.

14. A photographic camera, comprising a case formed with an exposure chamber and a finder chamber having an inclined bottom which is narrower at its front and bottom part than at its rear and top part, and which is narrower than the case to provide chambers between the side walls of the case and the finder chamber, the bottom of said finder chamber and the top part of said exposure chamber providing a rearwardly widening chamber which is otherwise open at its rear, means for keeping a device in reserve within said chamber provided between the bottom of the finder chamber and the top of the exposure chamber, and a lid for closing said chamber.

15. A photographic-film camera, comprising a case formed with an outwardly and rearwardly flaring light passage, film spool centres located with their axes laterally of the front part of said light passage, the bottom centres being extended downwardly through the bottom of the case, and a nipple for fixing the camera on a stand extending downwardly from the bottom thereof, the bottom parts of said centres and nipples extending to the same level to provide feet for the camera.

ÁRPÁD BARÉNYI.